United States Patent [19]

Masuda et al.

[11] Patent Number: 5,006,578

[45] Date of Patent: Apr. 9, 1991

[54] COMPOSITION FOR TEMPORARY PROTECTION PAINT

[75] Inventors: Tsuyoshi Masuda, Sakai; Hiromiti Tomihari, Hiratsuka; Masaki Muto, Samukawa; Naohito Saito, Sakura, all of Japan

[73] Assignees: Dainippon Ink and Chemicals, Inc., Tokyo; Yushiro Chemical Industry Co., Ltd., Chidori, both of Japan

[21] Appl. No.: 497,624

[22] Filed: Mar. 23, 1990

[30] Foreign Application Priority Data

Mar. 24, 1989 [JP] Japan .................... 1-70709

[51] Int. Cl.$^5$ .............................................. C08K 5/51
[52] U.S. Cl. ...................................... 524/128; 524/115
[58] Field of Search ........................................ 524/128

[56] References Cited

U.S. PATENT DOCUMENTS 3,776,871 12/1973 Bader et al. ..................... 524/128

FOREIGN PATENT DOCUMENTS 0056141 4/1980 Japan ................................. 524/128
0112973 9/1981 Japan ................................. 524/128

Primary Examiner—Joseph L. Schofer
Assistant Examiner—J. M. Reddick
Attorney, Agent, or Firm—Sherman and Shalloway

[57] ABSTRACT

A composition for temporary protection paint, containing alkali-soluble resin and an ester phosphite compound.

18 Claims, No Drawings

COMPOSITION FOR TEMPORARY PROTECTION PAINT

DETAILED DESCRIPTION OF THE INVENTION

The present invention relates to a novel and useful composition for temporary protection paint, and particularly to an alkali removable composition for temporary protection paint, remarkably improved in weather-resistance and including a copolymer of a compound containing unsaturated bond, in which an acid monomer such as $\alpha, \beta$-monoethylene type unsaturated acid is co-polymerized, and an ester phosphite compound.

The thus constituted composition, according to the present invention, is suitable for providing protection to a material to be painted, such as metal, glass, plastic, an already painted material, a plated material or the like which never degenerates itself by alkali treatment, and in particular is extremely useful for providing protection to a large size body of an automobile, a vehicle, an aircraft, a mechanical part or the like, and for primary preservation for various kinds of metal such as steel or the like. Further, it is, inter alia, advantageous for strippable paint.

By the way, the outer surface of an automobile or a vehicle may be contaminated by dust, soot, salt, iron powder, excretion from birds or the like although it is rare, direct sunlight, wind or rain, and may also be scratched, stained, discolored, rusted or cracked until it is delivered to the user. Of metallic products, steel which is industrially very important, is likely to be rusted under action of moisture and oxygen in the air.

The above-mentioned matters possibly causes the value of goods to be lowered remarkably, and the elimination of the defects requires huge labor and expensive cost. Accordingly, it is absolutely necessary to protect the outer surfaces of goods beforehand.

There have been proposed various kinds of protection processes and components in order to attain the above-mentioned purpose.

As one example of them, there has been proposed such a process that a protection composition applied on the outer surface of an article is mechanically stripped each time. However, most protection components used in this process belong to the solvent group, and accordingly, raise the risk of firing and the toxicity to a human body. Further, during stripping the protection composition, in the case of a large size article in particular, there has been such a disadvantage that a huge labor is required accordingly in the case of a large size article to be protected.

Further, in another process, the protection composition is removed by use of a solvent, but since it normally belongs to the wax group, it has been decomposed during a long storage period thereof or by direct sunlight, resulting in extremely difficult stripping work. Further, a large amount of solvent is required for stripping the protection composition in the above-mentioned process, and accordingly, the risk of firing, the toxicity to a human body, as well as disposition of effluent give great problems.

It has been well-known to use a rust-preventive oil as a primary anti-rust agent for a steel material, which is oil, grease or wax, and which is sometimes added with a small amount of organic amine, zinc naphthenate, petroleum oxide product, Turkey red oil, alkaline metallic salt, alkaline earth metallic salt or the like. The above-mentioned primary anti-rust agent coated over a steel material exhibits an excellent rust resistance and can be easily stripped therefrom by alkaline treatment after a secondary process if the shipping or storage period is short. However, should steel materials be reserved in an open-air storage condition or in a water drip condition, which is recently not rare, the effect of the above-mentioned rust preventing measures cannot be always expected greatly.

In addition, such a rust preventing coating film is liquid-like, which has a less mechanical strength, and accordingly, it is likely to damage a steel material. Further, the rust preventing coating film readily comes off from the outer surface of a steel material, being caused by contact with an adjacent another steel material. Thus, the steel material is rusted at that part.

As disclosed in Japanese Laid-Open Patent No. 49-97835, Japanese Laid-Open Patent No. 50-19885, Japanese Laid-Open Patent No. 50-89427 and Japanese Laid-Open No. 56-22368. there have been proposed these days satisfactory protection processes which are suitable for protecting large size articles with less risk of firing and toxicity and less problem of effluent treatment and with easily stripping work, and in which a protection composition having a water group resin base can be stripped by alkali aqueous solution during a stripping phase. However, none of the above-mentioned processes has yet given at the present stage a satisfactory result in view of various functions of the coating films, such as a workability for painting, a peel-off ability, water-proof ability and the like.

Meanwhile there has been well-known and well-used not only the above-mentioned water group resin but also acrylic group resin which is added therein with an ultraviolet ray absorbent or ultraviolet ray stabilizer such as a benzotriazole derivative, a benozoimidazole derivative, a hindered amine type compound or the like so as to improve the weather-resistance of the coating film.

However, the effect of the above-mentioned added ultraviolet ray absorbent or ultraviolet stabilizer which has been used as a substance for improving the weather resistance of acrylic resin obtained by use of a large amount of $\alpha, \beta$-monoethylene type saturated acid group (carboxyl group) is not evaluated, and/or the addition of a p-tert-butylphenol group compound or a carbodiimide compound, which have been generally used well does not give a substantial effect.

However, in order to obtain an aqueous coating composition for forming a protection film as a so-called strippable paint film which can improve the painting workability, the peel-off ability and the coating ability and which can be stripped easily by use of alkali aqueous solution even after outdoor exposure for a long time, with the repetitions of earnest studies made by the inventors in view of the above-mentioned various disadvantages inherent to the prior art, the present invention is devised based upon the finding of an aqueous coating composition for forming a protection film which can be stripped easily by alkali solution and which is highly useful.

Accordingly, a first object of the present invention is to provide an aqueous coating composition for forming a protection coating film of the kind, that is, a temporary protection paint composition which is improved especially in weather resistance for a long time.

In order to achieve the above-mentioned purpose, according to the present invention, there is provided a temporary protection paint component which is improved especially in weather resistance, and which is composed of a copolymer containing α, β-monoethylene type unsaturated acid group and an ester phosphite compound, and more specifically, which gives a coating film that is alkali-strippable and improved in weather resistance, and in which a suitable amount of one or more than one kinds of α, β-monoethylene type unsaturated acid is copolymerized with a compound other than the above-mentioned α, β-monoethylene type unsaturated acid, having one polymeric unsaturated bond per mole, and then the thus obtained copolymer is added with an ester phosphite compound during a process of adding water the copolymer so as to obtain a desired composition.

In this composition, as the above-mentioned α, β-monoethylene type unsaturated acid, any one of well-known and well-used unsaturated acid materials of this type can be, of course, used including various kinds of derivatives. Of these, most typical materials are maleic acid, fumaric acid, itaconic acid, and monoester of the former acids. Further, crotonic acid and (meth) acrylic acid may be also enumerated, in particular, acrylic acid or methacrylic acid is preferably or desirably used. Further, one of these kinds of unsaturated acids can be solely used, but more than one kinds thereof can also be used in combination.

Further, as the use amount of the above-mentioned unsaturated acid, 5 to 80 weight parts, preferably, 8 to 20 weight parts, are suitable, with respect to 100 weight parts of the entire compound containing polymeric unsaturated bonds.

If the above-mentioned use amount is less than 5 weight parts, it is likely to deteriorate anyway the peel-off ability of a protection film with the use of alkali. Meanwhile, if a large amount of the unsaturated acid, exceeding 30 weight parts, is used, neither the enhancement of the peel-off ability with the use of alkali can be expected any more, nor is it economical, and further, due to an increase in content rate of free carboxylic acid, thereby detrimental affection is given to a coated surface, and therefore it is unpreferable.

Then, as a compound which can be copolymerized with one or more than one kinds of the above-mentioned unsaturated acids, and which has one polymeric unsaturated bond per mole, any one of materials having a copolymerization with the unsaturated acids can, of course, be used. Of these, typical materials are, in particular, various kinds of ester (meth) acrylate such as methyl (meth) acrylate, ethyl (meth) acrylate, (meth) acrylic acid-n-butyl, (meth) acrylic acid-2-ethylhexyl, lauryl (meth) acrylate, (meth) acrylic acid-2-hydroxyethyl, (meth) acrylic acid 2 hydroxylpropyl, glucidyl (meth) acrylate or the like; α,-β-monoethylene; type unsaturated amide such as (meth) acrylic amide, N-methylol (meth) acrylic amide, N-methyl (meth) acrylic amide or the like, and α, β-monoethyl type unsaturated nitrile such as (meth) acrylonitrile or the like, in addition, within such a range that no detrimental effect is affected upon the water resistance, weather resistance, yellowing resistance, and the like of a coating film, there can be used olefin halide such as vinyl chloride, vinylidene chloride or the like; aromatic vinyl monomer such as s methyl styrene, vinyl toluene or the like; various kinds of vinyl ester such as vinyl acetate, vinyl propionate or vinyl ester which is commercially available under the registered trade mark "Veova" ( produced by Dutch Shell Co.,), or the like; α-olefin such as ethylene, propylene or the like; conjugated diene such as isoprene, butadiene or the like; and diester of unsaturated dicarbonate such as dimethyl maleate, dibutyl fumarate or the like. Further, either one kind of compounds containing polymeric unsaturated bonds can be used solely or more than one kinds of compounds can be used in combination.

Further, the use amount of the compound containing polymeric unsaturated bonds which can be copolymerized with the above-mentioned α, β-monoethylene type unsaturated acid is set to a value in a range from 95 to 70 wt.%, preferably 92 to 80 wt.%.

The process of preparing a copolymer used in the present invention, with the use of α, β-monoethylene type unsaturated acid and the compound containing polymeric unsaturated bonds, which can be copolymerized with the unsaturated acid, should not be limited to a specific one, and accordingly, polymeric methods such as a mass polymerization process, a dispersive polymerization process and the like can be used. However, in general, a so-called solution polymerization method carried out in an organic solvent, inter alia, a solution radical polymerization process is preferable.

In the case of using the above-mentioned solution radical polymerization process, several kinds of alcohol such as methanol, ethanol, n-propanol, isopropanol, n-butanol, sec-butanol, tert-butanol or the like; several kinds of ketone such as acetone, methyl ethyl ketone, methyl isobutyl ketone, cyclohexanone or the like; or several kinds of ester such as methyl acetate, ethyl acetate, acetate-n-butyl, isobutyl acetate, aluminum acetate or the like can be enumerated as a typical one. Either one kind of them can be solely used or more than one kinds thereof can be used in combination.

As the radical polymerization initiating agent, an azo group compound such as azobisisobutyronitrile, azobisisovaleronitrile, azobiscyanovalerianic acid or the like; organic peroxide such as cumene hydroperoxide, benzoyl peroxide and the like; or persulfate chloride such as ammonium persulfate, potassium persulfate or the like, may be enumerated as a typical one. Either one kind of them can be used solely, or more than one kinds of them can be used in combination.

The use amount of the above-mentioned radical polymerization initiating agent is set suitably to a value in a range from 0.01 to 2 wt.% with respect to the total amount of monomer.

It is noted that a well-known so-called redox polymerization process in which the above-mentioned radical polymerization initiating agent, metallic ions and a reducing agent are used in combination can also, of course, be used.

When, the thus obtained copolymer is added with an alkali substance so as to turn a part of the unsaturated acid group (carboxyl group) existing in the copolymer into salt, and thereafter, the copolymer is added further with water or, preferably, ion-exchange water so as to obtain a desired paint composition, in this case, the composition may be subjected to desolvation under reduced pressure so as to reduce the amount of the organic solvent in the composition.

Further, during the reaction of copolymerization, if a hydrophilic monomer having one polymeric unsaturated bond per mole and an average molecular weight of 1,500 to 15,000 and containing polyoxyethylene, chains is copolymerized within a range from 1 to 15 weight parts with respect to 100 weight part of the entire compound containing polymeric unsaturated bonds that is, a range from 1 to 15 wt.%, a part of the unsaturated acid group (carboxyl group) existing in the thus obtained copolymer may be simply added with water, without being purposely turned into salt by use of an alkali substance, thereby a desired stable paint composition, that is, a water base dispersion liquid of a copolymer containing $\alpha$, $\beta$-monoethylene type unsaturated acid group can be obtained.

In the present invention, the above-mentioned convenient process is recommended.

It is required that the thus obtained copolymer contains an ester phosphite compound in a range from 0.05 to 5 weight parts with respect to 100 weight parts of the copolymer so as to obtain a composition for temporary protection paint which is improved in weather resistance, according to the present invention. As such an ester phosphite compound, there may be enumerated as, as a typical example, trialky phosphite such as tridecyl phosphite, trinonyl phosphite or the like; triaryl phosphite such as triphenyl phosphite, trinonyl phenyl phosphite, tris(2,4-di-tert-butyl phenyl) phosphite, tetrakis(2,4-di-tert-butyl phenyl) -4,4'-biphenylene phosphite; or one or more than one kinds of compounds selected from derivatives of them.

It is evaluated that any one of these compounds gives an excellent weather resistance to the above-mentioned copolymer having a large amount of unsaturated acid (carboxyl group) added therewith. However, it is especially preferably to use a relatively higher molecular weight compound such as tris (2,4-di-tert-butyl phenyl) phosphite, tetrakis (2,4-di-tert-butyl phenyl)-4,4'-biphenylene phosphite or the like in view of the stability of hydrolysis from phosphite (est©r phosphite) to phosphate (ester phosphate).

The use amount of the above-mentioned ester phosphite compound is, as mentioned above, in a range from 0.05 to 5 weight parts with respect 100 weight parts of the entire copolymer containing $\alpha$, $\beta$-monoethylene type unsaturated acid group, and preferably n a range from 0.1 to 8 weight parts.

If the use amount is less than 0.05 weight parts, it is likely to remarkably lower anyway the effect of stabilization of the weather resistance. Meanwhile if the use amount is greater than 5 weight parts, it is not appreciated that he effect of stabilization*of the weather resistance is remarkably enhanced in proportion to the amount of addition even though it is added further more, that is, it is uneconomical accordingly. Thus, it is unpreferable since a problem of lowering the preservation stability of a desired composition according to the present invention possibly arise. It is more preferably in a range from 0.3 to 2 weight parts.

Further, the process of adding the above-mentioned ester phosphite compound into a compound containing $\alpha$, $\beta$-monoethylene type unsaturated group is not limited to a specific one. However, in general, it is added to an organic solvent solution of the above-mentioned copolymer after completion of copolymerizing reaction so as to be uniformly dispersed.

For the thus obtained desired composition according to the present invention, an ultraviolet ray absorbent, an ultraviolet ray stabilizer, an oxidization preventing agent or the like which are used in general, may be, of course, used simuultaneously in order to aim at enhancing and further promoting the effect of stabilization of the weather resistance of the above-mentioned ester phosphite compound itself. As such a usable ultraviolet ray absorbent, ultraviolet ray stabilizer or oxidation preventing agent, various kinds of salicylic acid such as phenyl salicylate, salicylic acid-4tert-butyl phenyl, 2,4-dihydroxybenzophenone 2-oxy-4-meth oxybenzophenione, 2-hydroxy-4-methoxybenzophenone, 2- (3,5-di-tert-amyl-2-hydroxyphenyl) benzotriazole, or the like; benzophenon or benzotriazol are enumerated as typical examples.

An acid component (that is, free carboxyl group or the like) existing in a water base dispersion liquid of the thus copolymer containing $\alpha$, $\beta$-monoethylene type unsaturated acid group may be neutralized with the use of a socalled volatile alkali substance such as ammonia, hormalin or the like as necessary. In this case, such an alkali substance may be used in such a manner that it is dissolved beforehand in water which is added during preparation of the above-mentioned water base dispersion liquid. Further, this alkali substance may be used, of course, in such a manner that it is added directly to the above-mentioned dispersion liquid after preparation of the latter.

On the contrary, the neutralization of the above-mentioned water base dispersion liquid by use of sodium hydroxide, potassium hydroxide, less volatile triethanol amine or the like, is not preferable since the water resistance of a formed film (temporary protection film) is remarkably deteriorated.

In order to protect the outer surface of an article to be painted with the use of the above-mentioned water base dispersion liquid of a composition for temporary protection paint according to the present invention, it may be sufficient that the article base material is painted by a well-known process such as a coating by a roll coater or a curtain flow coater, a brush coating, a flow coating, a spray coating, a dip coating or the like, and is then air-dried at a normal temperature or is forcedly dried.

In the above-mentioned case, the thickness of the dried film is suitably in a range of 5 to 70 micron, preferably in a range of 10 to 30 micron.

In order to strip the thus formed protection film of the composition according to the present invention, it is sufficient to use an alkali solution (alkali agent) as mentioned below, and the film can be easily stripped under the action of such an alkali solution.

Namely, 0.2 to 5 wt.% of a solution of any one of various kinds of basic compounds such as ammonia, sodium hydroxide, potassium hydroxide, calcium hydroxide, sodium metasilicate, sodium orthosilicate or the like, which is heated up to a temperature of 10 to 30 deg. C., is sprayed onto an article to be painted for about 10 sec. to 10 min., preferably for 15 sec. to 15 min., or the article is dipped in the solution of the above-mentioned basic compound, hereby the film can be easily and completely stripped.

Since the water base coating composition of the copolymer containing $\alpha$, $\beta$-monoethylene type unsaturated acid group, that is, the composition for temporary protection paint, according to the present invention, which is improved in weather resistance, is never decomposed through the treatment by the above-mentioned alkali agent (that is, alkali treatment), it can be applied suitably to any kind of base materials such as steel, cast iron, stainless steel, a plated article, a chromate-treated article, glass or worked articles thereof, several kinds of plastic materials or worked article thereof, ceramic such as ceramics or worked articles thereof; and the like. Further, it is extremely useful as a primary protection paint, especially for large size articles such as automobile, vehicles, aircrafts, machine parts or the like, or as a primary rust preventing paint for metal such as steel or the like, that is, as a strippable paint.

Next explanation will be specifically made of the present invention by way of reference examples and comparison examples, parts and percent (%) stated hereinbelow are based upon weight unless otherwise specified.

REFERENCE EXAMPLE 1

300 parts of isopropanol as a solvent was charged in a 2-1 flask have incorporated therein an agitator, a thermometer, a dripping funnel, a reflux condenser, and was heated up to a temperature of 85 deg. C. in a stream of nitrogen gas.

In addition, a mixture of organic compounds containing polymeric unsaturated bonds, obtained beforehand by mixing together 350 parts of methyl methacrylic acid, 280 parts of acrylic acid-n-butyl and 70 parts of methacrylic acid, and 14 parts of tert-butyl hydroperoxide were dripped and introduced into the flask for three hours through respective dripping funnels, and further, even after the completion of the dripping, they were held at the same temperature for six hours in order to continue copolymerizing reaction which was therefore completed.

Then, a solution containing 7 parts of tris (2,4-di-tert-butyl phenyl) phosphite as an additive dissolved beforehand in toluene was added into the flask and was uniformly dissolved.

Thereafter, the content of the flask was cooled down to a temperature of 50 deg. C., and after 13.5 parts of 25% aqueous ammonia being added into the flask, 1,050 parts of ion exchange water was moderately dripped, thereby obtaining a water base dispersion liquid of milk-white copolymer.

Then, this water base dispersion liquid was subjected to desolventation under a negative pressure condition so as to obtain a stable water base dispersion liquid having an unvolatile part of 40.2 %, a pH of 7.4 and a BROOK field viscosity (similarly used hereinbelow) of 830 cps at a temperature of 25 deg. C.

Thereafter, this water base dispersion liquid was diluted by ion exchange water so that the unvolatile part was reduced to 15%, and then was added with 27 parts of 25% aqueous ammonia, thereby obtaining a desired paint composition.

This composition is coated by a generally used air-spray up to a thickness of 10 to 20 micron onto a painted plate which was obtained in such a way that a melamine acrylic group enamel paint which is a finishing paint generally used in the automobile industrial field was coated on a chemically treated steel plate so as to have a dried film thickness of 80 to 40 micron and was then baked at a temperature 140 deg. C. for 30 min, and was thereafter dried so as to obtain a protection film.

During the above-mentioned stage there was no sagging during painting. Further, various coated film characteristics were examined. That is, the pencil hardness was 2H, the cross-cut adhesion was 100/100, and the water resistant whitening was excellent. Further, even with the result of a salt water spraying test, no rust was found even yet after lapse of 48 hours. That is, it was confirmed that it has excellent properties.

Further, the film after an irradiation test for 500 hours by use of a Sunshine Weather-O-Meter was dipped in 1% aqueous ammonia for one minute at a room temperature, and hen was washed only by water. As a result, the protection film was completely dissolved, and accordingly, it has also confirmed that it can be easily removed.

Incidentally, the result of a test of stability against hydrolysis (hydrolysis stability) was excellent. This test was relied upon the following method: After a solution of he desired composition, that is, the copolymer was left as it was for three months at a temperature of 40 deg. C., the solution was coated on a chemically treated steel plate, and the thus obtained film after drying was subjected to an irradiation test by use of the Sunshine Weather-O-Meter for 300 hours. Thereafter, the exterior appearance of the film was visually checked.

REFERENCE EXAMPLES 2 to 9 AND COMPARISON EXAMPLES 1 to 5

Solutions of desired copolymers and solutions of copolymers for comparison were prepared similarly to the reference example 1, excepting that change was made about kinds of reaction materials and use amounts as shown in Table 1.

Then, water base dispersion liquids were prepared thereafter similarly to the reference example, excepting that change was made to blended composition rates as shown in the same table, and thereafter, paint compositions were obtained with the use of the respective water base dispersion liquids.

Then, further, at first protection films were formed similarly to the same reference example, except for using the respective paint compositions, and then study and evaluation were made to various characteristics and the hydrolysis stability thereof.

The thus obtained results are all shown in the same table.

Incidentally, the references of evaluation are as follows:

⊚ : excellent;
○: very good;
Δ: slightly poor
x: very poor

The composition for temporary protection paint according to the present invention gives an excellent painting workability and an excellent protection characteristic, and further, even after outdoor exposure for a long time, it can be extremely easily removed by an alkali solution.

TABLE 1

|  |  | Reference Example | | | | | | | | |
|---|---|---|---|---|---|---|---|---|---|---|
|  |  | 1 | 2 | 3 | 4 | 5 | 6 | 7 | 8 | 9 |
| Material use ratio (part) | Acrylic acid-n-butyl | 40 | 40 | 40 | 40 | 40 | 40 | 40 |  | 40 |
|  | Methyl methacrylate | 50 | 50 | 50 | 50 | 50 | 50 | 50 | 25 | 45 |
|  | Ethyl methacrylate |  |  |  |  |  |  |  | 60 |  |
|  | Acrylic acid |  |  |  |  |  |  | 10 |  |  |
|  | Methacrylic acid | 10 | 10 | 10 | 10 | 10 | 10 |  | 15 | 15 |
| *Paint | Tris(2,4-di-tert-butylphenyl)phosphite | 1 | 3 |  |  |  |  | 1 | 1 | 1 |

TABLE 1-continued

| | | | | | | | | | | |
|---|---|---|---|---|---|---|---|---|---|---|
| blended rate (part) | Tridecyl phosphite | | | 1 | | | | | | |
| | Tris(nonyl-phenyl) phosphite | | | | 1 | | | | | |
| | Triphenyl phosphite | | | | | 1 | 0.2 | | | |
| | "CHINUBIN p" | | | | | | | 0.5 | | |
| | "SANOLE LS-770" | | | | | | | | | |
| | p-di-tert-butyl hydroxytoluene | | | | | | | | | |
| | 1,6-hexamethylene bis(N,N-di-methyl semicarbazide | | | | | | | | | |
| Sample copolymer unvolatile part (%) | | | | | | 15 | | | | |
| Hydrolysis stability | | ◉ | ◉ | ○ | ○ | ○ | ○ | ◉ | ◉ | ◉ |
| Paint film characteristic | Pencil hardness | 2H | H | H | H | H | H | H | 2H | H |
| | Adhesion | | | | | 100/100 | | | | |
| | Water resistant whitening | | | | | ◉ | | | | |
| | Sunshine Weather-O-Meter 200 hours | | | | | ◉ | | | | |
| | 350 hours | | | | | ◉ | | | | |
| | 500 hours | | | | | ◉ | | | | |
| | Outdoor exposure for one year | | | | | ◉ | | | | |

| | | Comparison Example | | | | |
|---|---|---|---|---|---|---|
| | | 1 | 2 | 3 | 4 | 5 |
| Material use ratio (part) | Acrylic acid-n-butyl | 40 | 40 | 40 | 40 | 40 |
| | Methyl methacrylate | 50 | 50 | 50 | 50 | 50 |
| | Ethyl methacrylate | | | | | |
| | Acrylic acid | | | | | |
| | Methacrylic acid | 10 | 10 | 10 | 10 | 10 |
| *Paint blended rate (part) | Tris(2,4-di-tert-butylphenyl)phosphite | | | | | |
| | Tridecyl phosphite | | | | | |
| | Tris(nonyl-phenyl) phosphite | | | | | |
| | Triphenyl phosphite | | | | | |
| | "CHINUBIN P" | | 1 | | | |
| | "SANOLE LS-770" | | | 1 | | |
| | p-di-tert-butyl hydroxytoluene | | | | 1 | |
| | 1,6-hexamethylene bis(N,N-di-methyl semicarbazide | | | | | 1 |
| Sample copolymer unvolatile part (%) | | | | 15 | | |
| Hydrolysis stability | | | | | | |
| Paint film characteristic | Pencil hardness | H | H | H | H | H |
| | Adhesion | | | 100/100 | | |
| | Water resistant whitening | | | Δ | | |
| | Sunshine Weather-O-Meter 200 hours | X | -Δ | -Δ | Δ | Δ |
| | 350 hours | X | Δ-X | Δ-X | X | X |
| | 500 hours | X | X | X | X | |
| | Outdoor exposure for one year | X | X | X | X | X |

*Weight part with respect 100 weight parts of copolymer
Note
(1) 2-(5-methyl-2-hydroxyphenyl) benzotriazol produced by CHIBA GUYGEE Co., Switzerland
(2) Bis(2,2,6,6-tetramethyl-4-piperidyl) SEBACATE produced by Sankyo Co., Ltd.
◉ : Excellent
⊙ : Very good
○ -Δ: Good
Δ: Slightly poor
Δ-X: Poor
X: Very poor

What we claim is:

1. A composition for temporary protection paint characterized by containing alkali soluble resin and an ester phosphite compound.

2. A composition for temporary protection paint as set forth in claim 1, wherein said composition is obtained by adding water to a copolymer of α, β-monoethylenically unsaturated acid and a compound containing unsaturated bonds other than said acid which is copolymerizable with the former unsaturated acid.

3. A composition for temporary protection paint as set forth in claim 1, wherein said composition is obtained by copolymerizing α, β-monoethylenically unsaturated acid and a compound containing unsaturated bonds other than said acid which is copolymerizable with the former unsaturated acid in an organic solvent to form a copolymer and then dispersing or dissolving the copolymer in water by using an alkaline compound.

4. A composition for temporary protection paint as set forth in claim 1, wherein said ester phosphite compound is trialkyl phosphite.

5. A composition for temporary protection paint as set forth in claim 1, wherein said ester phosphite compound is triaryl phosphite.

6. The composition of claim 2 wherein said α, β-monoethlyenically unsaturated acid is at least one dicarboxylic acid or monoester thereof or mono-carboxylic acid, said mono- or di-carboxylic acid being selected from the group consisting of maleic acid, fumaric acid, itaconic acid, crotonic acid, acrylic acid and methacrylic acid.

7. The composition of claim 2 wherein said α, β-monoethlyenically unsaturated acid is acrylic acid or methacrylic acid or mixture thereof.

8. The composition of claim 3 wherein said α, β-monoethlyenically unsaturated acid is at least one dicarboxylic acid or monoester thereof or mono-carboxylic acid, said mono- or di-carboxylic acid being selected from the groups consisting of maleic acid, fumaric acid, itaconic acid, crotonic acid, acrylic acid and methacrylic acid.

9. The composition of claim 3 wherein said α, β-monoethlyenically unsaturated acid is acrylic acid or methacrylic acid or mixture thereof.

10. The composition of claim 2 wherein said copolymer comprises from 5 to 30 weights part of said unsaturated acid and from 95 to 70 weight parts of said compound containing unsaturated bonds other than said acid.

11. The composition of claim 3 wherein said copolymer comprises from 5 to 30 weights part of said unsaturated acid and from 95 to 70 weight parts of said compound containing unsaturated bonds other than said acid.

12. The composition of claim 2 wherein said compound containing unsaturated bonds other than said acid is an ester, amide or nitrile selected from the group consisting of methyl(meth)acrylate, ethyl(meth)acrylate, n-butyl(meth)acrylate, 2-ethylhexyl(meth)acrylate, lauryl(meth)acrylate, 2-hydroxyethyl(meth)acrylate, 2-hydroxypropyl(meth)acrylate, glycidyl(meth)acrylate, (meth)acrylic amide, N-methylol(meth)acrylic amide, N-methyl(meth)acrylic amide, and (meth)acryionitrile.

13. The composition of claim 3 wherein said compound containing unsaturated bonds other than said acid is an ester, amide or nitrile selected from the group consisting of methyl(meth)acrylate, ethyl(meth)acrylate, n-butyl(meth)acrylate, 2-ethylhexyl(meth)acrylate, lauryl(meth)acrylate, 2-hydroxyethyl(meth)acrylate, 2-hydroxypropyl(meth)acrylate, glycidyl(meth)acrylate, (meth)acrylic amide, N-methyl(meth)acrylic amide, N-methylol(meth)acrylic amide, and (meth)acryionitrile.

14. The composition of claim 1 wherein the ester phosphite compound is present in an amount of from about 0.05 to 5 weight parts with respect to 100 weight parts of the alkali soluble resin.

15. The composition of claim 2 wherein the ester phosphite compound is present in an amount of from about 0.05 to 5 weight parts with respect to 100 weight parts of the copolymer.

16. The composition of claim 3 wherein the ester phosphite compound is present in an amount of from about 0.05 to 5 weight parts with respect to 100 weight parts of the copolymer.

17. The composition of claim 1 wherein the ester phosphite compound is present in an amount of from about 0.01 to 3 weight parts with respect to 100 weight parts of the alkali soluble resin, 18. The composition of claim 1 wherein said ester phosphite compound is tris(2,4-di-tert-butyl phenyl) phosphite or tetrakis(2,4-di-tert-butyl phenyl)-4-4'-biphenylene phosphite.

* * * * *